(12) United States Patent
Mohrin

(10) Patent No.: US 6,185,179 B1
(45) Date of Patent: Feb. 6, 2001

(54) APPARATUS AND METHOD FOR RECORDING AND PLAYING BACK SOUND

(76) Inventor: Carl M. Mohrin, 552 Charlestown Rd., Hampton, NJ (US) 08827

(*) Notice: Under 35 U.S.C. 154(b), the term of this patent shall be extended for 0 days.

(21) Appl. No.: 09/143,816

(22) Filed: Aug. 31, 1998

(51) Int. Cl.[7] .................................................. G11B 3/00
(52) U.S. Cl. ............................................................ 369/127
(58) Field of Search ............................ 369/127, 99, 153, 369/176, 177, 260, 272, 292, 258, 63, 155, 245, 273

(56) References Cited

U.S. PATENT DOCUMENTS

| | | | | |
|---|---|---|---|---|
| 200,521 | * | 2/1878 | Edison | 369/155 |
| 695,159 | * | 3/1902 | Lambert | 369/272 |
| 1,076,741 | * | 10/1913 | Bliss | 369/155 |
| 1,997,489 | * | 4/1935 | Herrmann et al. | 369/272 |
| 2,020,381 | * | 11/1935 | Labowitz et al. | 206/216 |
| 2,060,287 | * | 11/1936 | Dofsen | 264/106 |
| 2,066,859 | * | 1/1937 | Schiler | 369/245 |
| 2,164,663 | * | 7/1939 | Ottofy | 369/63 |
| 2,262,148 | * | 11/1941 | Runge | 369/245 |
| 2,489,146 | * | 11/1949 | Louchheim | 369/245 |
| 2,491,037 | * | 12/1949 | Dofsen | 369/63 |
| 2,493,511 | * | 1/1950 | Van Eps | 369/245 |
| 2,532,293 | * | 12/1950 | De Weese | 369/245 |
| 2,689,736 | * | 9/1954 | Siegel | 369/63 |
| 3,228,699 | * | 1/1966 | Rost | 369/245 |
| 3,269,734 | * | 8/1966 | Ottofy | 206/216 |
| 3,711,988 | * | 1/1973 | Summerfield et al. | 369/63 |
| 4,121,835 | * | 10/1978 | Garabedian | 138/121 |

FOREIGN PATENT DOCUMENTS

476078  *  12/1935  (GB) .

OTHER PUBLICATIONS

"Electricity in the Service of Man", edited by R. Wormell; published by Cassell & Company, New York; 1886, pp. 752–753.

"The Speaking Telephone," by George B. Prescott, published by D. Appleton & Company, New York; 1879, pp. 300–305.

"Elementary Lessons on Sound," by Dr. W.H. Stone, published by Macmillan and Co., Limited, London; pp. 87–90; 1908.

"A Text–book on Sound," by Edwin H. Barton, published by Macmillan and Co., Limited, London pp. 614–619; 1919.

Starling et al., "The 'Vibratophone': a new phonograph", Jul. 1907, Talking Machine News, V, 60, 243–244.*

* cited by examiner

Primary Examiner—David L. Ometz
Assistant Examiner—Julie Anne Watko
(74) Attorney, Agent, or Firm—Adel A. Ahmed

(57) ABSTRACT

A phonograph comprises an acoustically compliant cylindrical chamber for being set into vibration by impinging sound waves, the chamber having a substantially smooth outer surface and being mounted for axial rotation and for being advanced at a predetermined rate upon said axial rotation; and an acoustically non-compliant stylus, the stylus bearing against the outer surface in a spiral path thereupon when the cylinder is caused to rotate and to advance at the predetermined rate. During recording, the vibrating cylinder wall impales itself upon the non-vibrating stylus so that a recording groove with undulations is formed on the cylinder. During playback, the cylinder vibrates in response to the recording groove undulations being pressing against the stationary stylus.

20 Claims, 2 Drawing Sheets

Figure 3:
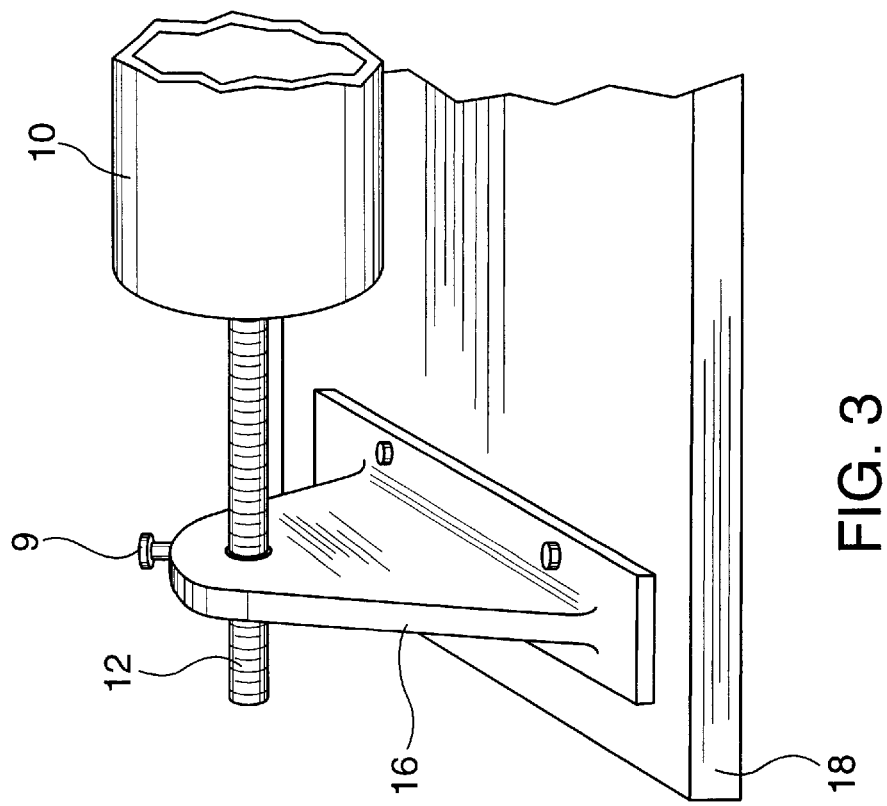

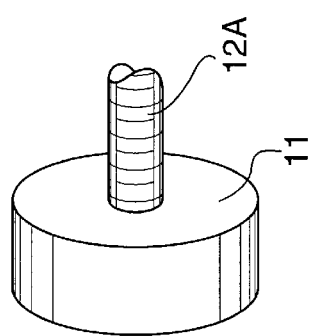
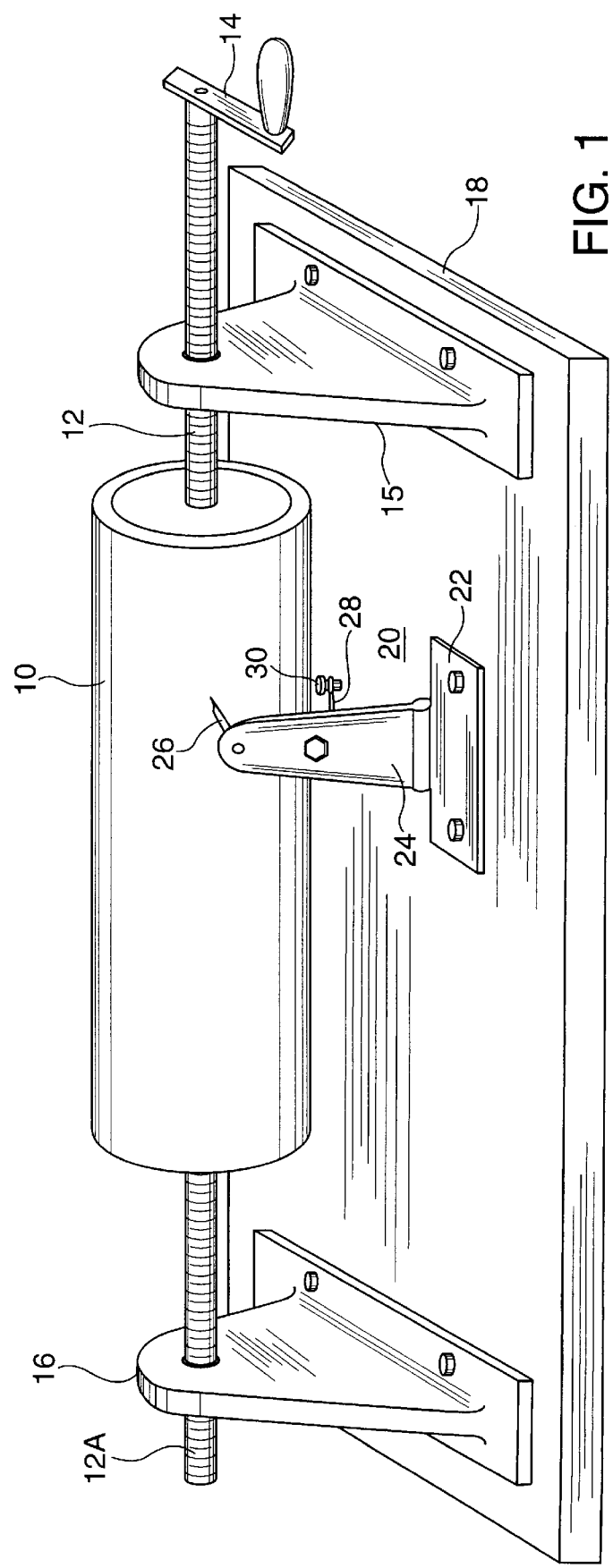

APPARATUS AND METHOD FOR RECORDING AND PLAYING BACK SOUND

The present invention relates to the field of sound recording and play-back apparatus and, more specifically, to the field of acoustic phonographs.

As invented and pioneered by Edison, the phonograph in one form comprises a brass cylinder covered in tinfoil, thin copper plate, or soft iron. Wax was also used for the cylinder. The cylinder is mounted on a threaded rod passing through a female screw fastened to a support fixed to the frame or base of the phonograph. A crank is fixed to the end of the threaded rod. A movable support, which is fixed to the frame, carries a mouthpiece with a membrane or diaphragm. The membrane is acoustically constructed to be relatively acoustically compliant and can be set into vibration. A steel pin, needle, or stylus is mounted on a spring fixed to the base and is coupled to the diaphragm, typically by way of a piece of rubber for movement with the diaphragm as it vibrates under the action of sound waves.

In operation, when one speaks into the mouthpiece of Edison's phonograph, the sounds enter it and cause the compliant membrane to vibrate. This causes the pin to vibrate in a similar manner. To register or record speech, the pin is adjusted to bear lightly on the tinfoil or copper plate by locking the movable support. The cylinder is rotated by the crank and it advances axially by the threaded rod as words are spoken into the mouthpiece. In Edison's phonograph, the cylinder is so constructed as to be relatively acoustically non-compliant or rigid so that it resists the varying pressure of the pin as the pin vibrates under the action of sound waves impinging on the membrane. As a result, the pin presses into the tinfoil or copper plate so as to dig into the surface of the resisting cylinder with a varying force, so that an impression is left on the rotating surface with hills and valleys, or undulations, depending on the vibrations of the pin.

To reproduce the words spoken, the movable support is loosened so that the pin is free of the cylinder, which is then brought back to its starting position. The pin is now set to bear on the cylinder tin or copper plate again with a somewhat lighter force so as to go over the original track it made while recording. The cylinder is rotated and, because the cylinder is acoustically non-compliant, it is the compliant needle which is forced to vibrate in response to the recorded undulations on the cylinder. This causes the diaphragm to vibrate and so to reproduce the recorded sound back through the mouthpiece.

Thus, in Edison's phonograph, the needle or pin in its mounting must be sufficiently compliant to vibrate together with the membrane receiving the sound vibrations. On the other hand, the cylinder must be non-compliant to vibrations so that it can resist the onslaught of the vibrating needle during the process of recording and thereby allow the needle to cut a hill and dale recording groove or track of varying depth corresponding to the recorded sound. During playback, the cylinder must hold firm as the hills and dales in the recording groove force the compliant needle to and fro, recreating the sound vibrations when the needle's vibrations are communicated to the membrane and so to the surrounding air, by way of the horn. Accordingly, the function of the cylinder in Edison's phonograph is to receive and retain the sound groove while recording, and to cause the groove to set the needle vibrating during playback. The horn and the membrane channel the sound vibrations from the air to the needle for recording and back from the needle to the air during playback.

Further background information on the Edison phonograph apparatus may be found in, for example, "Electricity in the Service of Man," edited by R. Wormell; published by Cassell & Company, New York, pages 752–753; 1886; "The Speaking Telephone," by George B. Prescott, published by D. Appleton & Company, New York, pages 302–305; 1879; "Elementary Lessons on Sound," by Dr. W. H. Stone, published by Macmillan and Co., Limited, London; pages 87–90; 1908; and "A Text-book on Sound," by Edwin H. Barton, published by Macmillan and Co., Limited, London; pages 614–619; 1919.

In accordance with an aspect of the invention, a phonograph comprises an acoustically compliant cylindrical chamber for being set into vibration by impinging sound waves, the chamber having a substantially smooth outer surface and being mounted for axial rotation and for being advanced at a predetermined rate upon the axial rotation; and an acoustically non-compliant stylus, the cylinder wall bearing against the stylus in a spiral path when the cylinder is caused to rotate and advance at the predetermined rate. During recording, the cylinder is caused to vibrate by sound impinging upon it from the surrounding air. The vibrating cylinder wall impales itself upon the non-vibrating stylus so that a recording groove with undulations is formed on the cylinder, also referred to as a "hill and dale" mode of recording. During playback, the cylinder vibrates in response to the recording groove undulations being pressed against the stationary stylus and communicates its vibrations in the form of sound to the surrounding air.

In accordance with another aspect of the invention, a phonograph comprises a rotatable lead screw; a cylinder axially mounted on the lead screw for rotation therewith; and a stylus mounted such that the cylinder bears against the stylus, the stylus being essentially acoustically non-compliant.

In accordance with another aspect of the invention, a phonograph comprises a rotatable lead screw; a cylinder axially mounted on the lead screw for rotation therewith, the cylinder being acoustically compliant; and a stylus mounted for bearing against the cylinder.

In accordance with another aspect of the invention, the cylinder is acoustically compliant.

In accordance with another aspect of the invention, the cylinder is acoustically responsive to sound waves impinging thereupon and vibrates in sympathy therewith.

In accordance with another aspect of the invention, the cylinder is hollow and is made of a material capable of receiving and retaining impressions made by the stylus.

In accordance with another aspect of the invention, the cylinder is made of a plastic material.

In accordance with another aspect of the invention, a surface of the cylinder is lubricated by a lubricant substance such as standard machine lubricating oil.

In accordance with another aspect of the invention, a phonograph includes a controllable force device for urging or biasing the stylus into contact with the cylinder.

In accordance with another aspect of the invention, a phonograph includes controllable bias apparatus for urging the stylus into contact with the cylinder with a force exhibiting a first value sufficient for the stylus to cut a sound recording groove in the cylinder as the cylinder vibrates and exhibiting a second, lesser, value sufficient for setting the cylinder into vibration by the action of the sound recording groove upon the stylus.

In accordance with another aspect of the invention, a phonograph comprises a relatively acoustically compliant cylindrical chamber for being set into vibration by impinging sound waves, the chamber having a substantially smooth outer surface and being mounted for axial rotation and for being advanced at a predetermined rate upon the axial rotation; and a relatively acoustically non-compliant stylus, the outer surface bearing against the stylus so as to trace a spiral path thereupon when the cylinder is caused to rotate and to advance at the predetermined rate.

In accordance with another aspect of the invention, a phonograph comprises a base plate; a pair of supports mounted on the base plate, whereof at least one of the supports includes a screw thread; a threaded rod supported on the supports and engaging the screw thread; a crank coupled to the threaded rod for rotating it; a hollow cylinder mounted concentrically on the threaded rod for rotation therewith, the cylinder being essentially acoustically compliant and susceptible of relatively large amplitude vibrations in response to impinging sound waves; and a stylus assembly mounted on the base plate, including a stylus for contacting the cylinder, the stylus assembly including a bias device developing a pressure force between the stylus and the cylinder, the stylus being affixed to the stylus assembly so as to be essentially acoustically non-compliant and susceptible of only relatively small amplitude vibrations.

In accordance with another aspect of the invention, a method for recording and playing back sounds, comprising the steps of: causing the sounds to impinge on a cylinder so as to set the cylinder into vibrations responsive to the sounds; rotating the cylinder and advancing it at a predetermined rate as it rotates; and pressing a stationary, non-vibrating stylus or point against an outside surface of the cylinder as it rotates and advances.

In accordance with another aspect of the invention, a method for recording and playing back sounds, comprises the steps of: causing the sounds in surrounding air to impinge on a cylinder so as to set the cylinder into vibrations responsive to the sounds; rotating the cylinder in a recording mode and advancing it at a predetermined rate as it rotates; pressing a stationary, non-vibrating stylus or point against a surface of the cylinder as it rotates and advances forming a spiral groove on the surface, the vibrations causing the cylinder to impale itself upon the stylus to a varying extent depending on the vibrations and thereby form recorded hills and dales in the groove: and playing back by rotating the cylinder in a playback mode so that the spiral groove is pressed against the stylus so as to cause the cylinder to vibrate responsive to the recorded hills and dales in the groove and impart corresponding vibrations to the surrounding air as played back sound.

Figure 2:
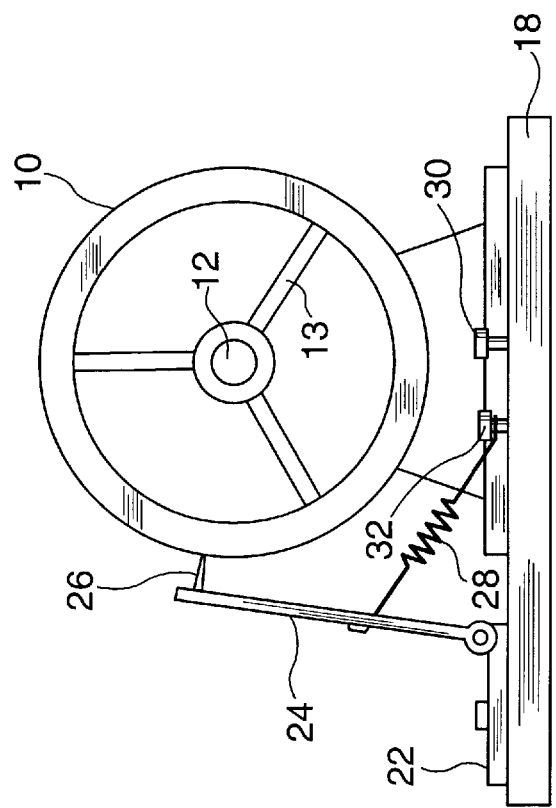

The invention will be better understood from the following description of the preferred embodiments, in conjunction with the Drawing, in which FIG. 1 shows in approximately isometric projection a phonograph in accordance with the principles of the invention; and FIGS. 2, 3 and 4 show further details of a phonograph in accordance with the invention.

The drawings are not necessarily drawn to scale.

FIG. 1 shows a phonograph in accordance with the invention. A cylinder 10 is constructed so as to be relatively acoustically compliant. Cylinder 10 is substantially hollow and is readily set into sympathetic vibration with sound waves impinging upon it. To that end, the cylinder wall is made to have an appropriate thickness so that sound waves in the vicinity cause the cylinder wall to vibrate. By way of example, the present inventor has found that the wall thickness in a typical, commercially available plastic bottle as used for the sale of soda beverage, is sufficiently compliant and exhibits generally suitable properties for this purpose, even though not especially optimized for this purpose. A modified, empty soda bottle can be used successfully for the function.

In the preferred, illustrative embodiments herein described, the ends of cylinder 10 are closed. Cylinder 10 is fixed on a threaded rod 12 for axial rotation therewith. Although operation with an open-ended cylinder was not attained experimentally, it is within the contemplation of the invention that, with suitable modification, an embodiment could be made to work with an end of cylinder 10 at least partly open or made of a soft sound absorbent material whereby threaded rod 12 can pass through a reinforcing "spider" or centering structure 13 fixed at the end of cylinder 10, as shown in FIG. 2. Threaded rod 12 has a crank 14 at one end thereof by which it may be rotated. Rod 12 passes through holes in a pair of supports or trunnions 15 and 16, which are fixed to a base plate 18. At least one of the holes is threaded to mate with threaded rod 12.

A hinge 20 has one part 22 thereof affixed to base plate 18. The other part 24 of hinge 20 is hingedly coupled to part 22 so that, when it is otherwise unconstrained, hinge part 24 is rotatable with respect to hinge part 22. A pin, needle, or stylus 26 is affixed to hinge part 24. As shown in FIG. 1, hinge part 24 is coupled to one end of a spring or a rubber band 28 whose other end is anchored to base plate 18 by an anchoring screw 30 or, alternatively, by an anchoring screw 32 as shown in FIG. 2, as will be further explained below. Spring or rubber band 28 urges or biases hinge part 24 to move towards cylinder 10 and stylus 26 comes into pressure contact with cylinder 10, the amount of pressure force between the cylinder and the stylus being responsive to the characteristics and point of anchoring of spring or rubber band 28.

Stylus 26 is rotatable in an arc about the hinge pin of hinge part 22, as was explained above. Although stylus 26 is movable in conjunction with hinge part 24, it is relatively not acoustically compliant primarily because of the inertial mass of hinge part 24 to which it is fastened and therefore essentially does not move in response to any vibration of cylinder 10: it is acoustically stiff and essentially cannot be put into vibration. Accordingly, it will generally rest upon the surface of cylinder 10 because of the biasing effect of spring 28 and it will tend only to follow the cylinder surface as to any minor variations in diameter or minor eccentricity in the rotation, which movements are at a relatively slow rate as compared with acoustic vibrations.

On the other hand, as the relatively acoustically compliant wall of cylinder 10 vibrates in response to impinging sound waves, the relatively acoustically non-compliant stylus 26 will remain substantially unmoved by such vibration. Therefore, cylinder 10 will tend to "impale" itself on acoustically stationary, or non-vibrating, stylus 26 to a varying extent, depending on the acoustic vibration of its wall. The wall of cylinder 10 will tend push more strongly against stylus 26 when the sound vibration of cylinder 10 tends to move its wall towards stylus 26 and so it will impale itself more strongly and receive a deeper groove. Conversely, when the sound vibration tends to move the wall of cylinder 10 in a direction away from stylus 26, the wall will impale itself more lightly against stylus 26 and thereby receive a shallower groove. As a result of its varying pressure against acoustically stationary stylus 26, the surface of cylinder 10 is marked or scored by stylus 26 with a hill and dale soundtrack corresponding to the sound that is causing cylinder 10 to vibrate.

For playing back the recording, hinged stylus 26 is pulled back from cylinder 10 to break contact therewith, and cylinder 10 is brought back to its starting position. This may be accomplished by cranking back threaded rod 12 or by using a quick release threaded nut with a release button, as is commonly known in, for example, miter clamps for saws, as indicated by quick release button 9 in FIG. 3. Stylus 26 is then reset in the groove previously made during recording and the tension of spring or a rubber band 28 is set to a lower value than was used for making the recording for reducing the bias force. This is readily accomplished by selecting anchoring screw 32 on base plate 18 that is closer to hinge portion 22 than anchoring screw 30, used in recording. Otherwise a simple movable linkage or slide (not shown) can be used to accomplish the same result. By using a smaller force for playing back than for recording, the recording track, or sound-track, is preserved from unnecessary wear by the stylus and remains usable for repeated playbacks of the recorded sound.

As stylus 26 follows the groove for playback, the hills and dales of the soundtrack will cause the pressure force between stylus 26 and the wall of cylinder 10 to vary in accordance with the recorded sound waves. Since stylus 26 is relatively acoustically non-compliant or stiff as has been explained and essentially does not vibrate, and since the wall of cylinder 10 is relatively acoustically compliant, it is the cylinder wall that will be set into vibrating motion by the action of non-compliant stylus 26 due to the varying force produced by the hills and dales of the groove. These vibrations of cylinder 10 will essentially represent a replica of the recorded sound waves. Cylinder 10 by its size will tend to act to provide acoustic coupling to the surrounding air for creating corresponding sound waves. It is an object of the present invention that the sounds can thus be reproduced using the cylinder itself as the playback transducer, without the need for a diaphragm or horn.

The material of which cylinder 10 is made is capable of receiving and retaining the impressions made upon it by pin or stylus 26. A number of materials are suitable for the purpose. As has been mentioned above metals have been used and, as was noted, the present inventor has also found plastics to be suitable, including materials such as are typically used for making soda or soft drink bottles. The inventor has also found that applying a lubricant, such as common household type lubricating oil, for example, to the cylinder surface is beneficial in reducing noise during recording and playback.

In accordance with the invention, a function of the cylinder is also to act as a microphone or transducer when recording by setting its wall to vibrate responsive to sound impinging on it or entering its interior, and as a sound reproducer or sound output coupling device during playback as its wall couples vibrations to the surrounding air. The cylinder thus provides all three functions of microphone, recording medium, and playback device in an economical manner.

It is useful in developing an fuller understanding of the present invention to contrast the mode of operation with that of Edison phonograph. In Edison's phonograph, the stylus receives vibrations from a diaphragm which is vibrated by impinging sound waves entering the horn. The vibrating needle cuts a groove in the cylinder, digging in more, or less, in accordance with its vibrations. For this to work properly, the cylinder must resist the needle's action so as to be cut in the process. During playback, the rigid cylinder's hills and dales set the needle vibrating and the diaphragm converts these vibrations to air sound back through the horn. As has been explained, in the present invention, it is the flexible cylinder which is set vibrating by sound waves impinging upon it and it essentially impales itself upon a fixed needle, or stylus, thereby receiving a groove whose depth is a function of the cylinder's vibrations. During playback, the cylinder wall is set vibrating by the hills and dales in the groove pressing against the stationary stylus and the cylinder converts these vibrations into air sounds, no diaphragm or horn being required. In the present exemplary embodiment, stethoscopy was utilized to verify performance during playback.

Naturally, the cylinder and the stylus bear upon each other, exerting equal and opposite forces; however, when the cylinder is set to vibrating, either under the influence of sound or by the hills and dales of the recording groove, it is the cylinder that moves in its vibration and the stylus or needle remains relatively stationary as to such vibrations.

FIG. 4 shows another embodiment wherein a flywheel 11 is affixed to the end 12A of threaded rod 12 for rotation therewith. While flywheel 11 is by no means essential to the operation of the phonograph in accordance with the present invention, the rotational momentum of flywheel 11 can be helpful in maintaining a uniform rate of rotation by tending to average out fluctuations in cranking.

There has been described by way of exemplary embodiments a phonograph that is readily constructed using relatively inexpensive parts, useful for recording and reproducing sound, as well as illustrating essential principles of sound recording and thus further useful as a device for recording sounds, including speech and further useful as an entertaining, philosophical, and pedagogical instrument for instruction in the theory of sound or indeed, as a toy.

While the invention has been described by way of illustrative embodiments, it will be understood by one skilled in the art to which it pertains that various changes and modifications can be undertaken without departing from the spirit of the invention. For example, in place of crank 14, various other drive means can be substituted, such as an electric motor, a spring or rubber band motor, an arrangement of gears with a crank or any other convenient source of rotational driving force. Furthermore, while a rubber band and spring have been described for causing the stylus to press against the cylinder, it is envisioned that an unbalanced weight, an attracting magnet or the like may be utilized to provide the biasing function. It is also disclosed that the recording cylinder receives sound waves directly: this function may be optionally supplemented by having a flaired end or horn shape to an end of the cylinder. While the preferred embodiment has the groove on the outside of the cylinder, a groove could be cut on the inside of the cylinder. This is considered less convenient, since such a groove is less readily accessible and the bearing system has to be modified to allow placement of a stationary stylus inside the cylinder; nevertheless, such an arrangement is possible, in principle. Such and the like modifications are intended to be within the scope of the invention which is defined by the claims following.

What is claimed is:

1. A phonograph comprising:
   a rotatable lead screw;
   a unitary cylinder formed as a cylindrical resonating chamber for communicating sound waves directly to and from the air, for serving as a sound recording transducer and as a sound reproducer, said cylinder being coaxially mounted on said lead screw for rotation therewith; and
   a stylus mounted for bearing against a curved wall of said cylinder, said stylus being mounted to be acoustically non-compliant as compared with said cylinder.

2. A phonograph as recited in claim 1, wherein said cylinder is acoustically compliant as compared with said stylus.

3. A phonograph as recited in claim 2, wherein said cylinder is acoustically responsive to sound waves impinging thereupon and vibrates in sympathy therewith.

4. A phonograph as recited in claim 3, wherein said cylinder is hollow and is made of a material capable of receiving and retaining impressions made by said stylus.

5. A phonograph as recited in claim 4, wherein said cylinder is made of a plastic material.

6. A phonograph as recited in claim 2, including a controllable force device for urging or biasing said stylus into contact with said cylinder.

7. A phonograph as recited in claim 2, including controllable bias means for urging said stylus into contact with said cylinder with a force exhibiting a first value sufficient for said stylus to cut a sound recording groove in said cylinder as said cylinder vibrates and exhibiting a second, lesser, value sufficient for setting said cylinder into vibration by the action of said sound recording groove upon said stylus.

8. A phonograph as recited in claim 7, wherein said controllable bias means comprises a rubber band arrangement exhibiting first and second tension configurations.

9. A phonograph as recited in claim 7, wherein said controllable bias means comprises a spring controlled hinged lever.

10. A phonograph as recited in claim 2, including a pair of brackets or trunnions, whereof at least one includes a respective threaded portion for engaging a screw thread of said lead screw.

11. A phonograph as recited in claim 10, wherein said threaded portion comprises a quick release mechanism.

12. A phonograph as recited in claim 2, wherein a surface of said cylinder is lubricated by a lubricant substance.

13. A phonograph comprising:
a rotatable lead screw;
an acoustically compliant unitary cylinder formed as a cylindric resonating chamber for communicating sound waves directly to and from the air, for serving as a sound recording transducer and as a sound reproducer; and
a stylus mounted for bearing against a curved wall of said cylinder, said stylus being mounted to be acoustically non-compliant.

14. A phonograph comprising:
a unitary cylindrical chamber, said chamber being sufficiently acoustically compliant for being set into vibration by impinging sound waves, said chamber having a substantially smooth curved outer surface and serving as a cylindrical resonating chamber for communicating sound waves directly to and from the air, and for serving as both a sound recording transducer and a sound reproducer, said cylinder being mounted for axial rotation and for being advanced at a predetermined rate upon said axial rotation; and
a stylus, said curved outer surface bearing against said stylus so as to trace a helical path thereupon when said cylinder is caused to rotate and to advance at said predetermined rate, wherein said stylus is mounted to be acoustically non-compliant as compared with said cylinder.

15. A phonograph as recited in claim 14, including a stylus mount for supporting said stylus and causing a bearing force of selectable magnitude between said stylus and said outer surface.

16. A phonograph as recited in claim 15, wherein said stylus mount comprises a hinged member.

17. A phonograph comprising:
a base plate;
a pair of supports mounted on said base plate, whereof at least one of said supports includes a screw thread;
a threaded rod supported on said supports and engaging said screw thread;
a crank coupled to said threaded rod for rotating it;
a unitary hollow cylinder, said cylinder being formed as a cylindrical resonating chamber and being mounted concentrically on said threaded rod for rotation therewith;
a stylus assembly mounted on said base plate so as to be acoustically non-compliant, including a stylus for contacting a curved wall of said cylinder, said stylus assembly including a bias device developing a pressure force between said stylus and said cylinder, said stylus being affixed to said stylus assembly so as to be acoustically non-compliant as compared with said cylinder; and
wherein said unitary cylinder is acoustically compliant, susceptible of acoustic vibrations for serving as said cylindrical resonating chamber for communicating sound waves directly to and from the air, for serving as a sound recording transducer and for serving as a sound reproducer, and said stylus is not susceptible of significant acoustic vibrations, as compared with said unitary cylinder.

18. A phonograph as recited in claim 17, wherein said cylinder is made from a plastic soda bottle.

19. A phonograph as recited in claim 17, including a flywheel affixed to said threaded rod for rotation therewith.

20. A method for recording and playing back sounds, comprising the steps of:
causing said sounds in surrounding air to impinge on a unitary cylinder which forms a cylindrical resonating chamber for communicating sound waves directly to and from the air, for serving as a sound recording transducer and as a sound reproducer, so as to set said cylinder into vibrations responsive to said sounds;
recording said sounds by rotating said unitary cylinder and advancing it at a predetermined rate as it rotates;
pressing a stationary, non-vibrating stylus or point against a curved surface of said unitary cylinder as it rotates and advances forming a helical groove on said curved surface, said vibrations causing said cylinder to impale itself upon said stylus to a varying extent depending on said vibrations and thereby form recorded hills and dales in said groove; and
playing back said sounds by rotating said unitary cylinder so that said helical groove is pressed against said stylus so as to cause said cylinder to vibrate responsive to said recorded hills and dales in said groove and impart corresponding vibrations to said surrounding air as played back sound.

* * * * *